United States Patent
Valentova et al.

(10) Patent No.: US 8,494,692 B2
(45) Date of Patent: Jul. 23, 2013

(54) METHOD AND DEVICE FOR AIDING THE PILOTING OF AN AIRCRAFT DURING A LANDING

(75) Inventors: Fabrice Valentova, Seysses (FR); Jerome Journade, Tournefeuille (FR)

(73) Assignee: Airbus Operations (SAS), Toulouse Cedex (FR)

(*) Notice: Subject to any disclaimer, the term of this patent is extended or adjusted under 35 U.S.C. 154(b) by 266 days.

(21) Appl. No.: 13/063,821

(22) PCT Filed: Sep. 14, 2009

(86) PCT No.: PCT/FR2009/001088
§ 371 (c)(1),
(2), (4) Date: Mar. 14, 2011

(87) PCT Pub. No.: WO2010/055218
PCT Pub. Date: May 20, 2010

(65) Prior Publication Data
US 2011/0166723 A1     Jul. 7, 2011

(30) Foreign Application Priority Data
Sep. 16, 2008    (FR) ................................. 08 05067

(51) Int. Cl.
*G05D 1/00* (2006.01)
*G05G 5/00* (2006.01)
*G06F 19/00* (2011.01)

(52) U.S. Cl.
USPC ................................ 701/16; 701/18; 340/973

(58) Field of Classification Search
USPC ................. 701/16, 15, 18; 340/973; 244/111, 244/183
See application file for complete search history.

(56) References Cited

U.S. PATENT DOCUMENTS

| | | | | |
|---|---|---|---|---|
| 5,142,478 A | * | 8/1992 | Crook | 701/16 |
| 5,968,106 A | * | 10/1999 | DeVlieg et al. | 701/70 |
| 6,304,800 B1 | * | 10/2001 | Ishihara et al. | 701/16 |
| 2007/0208466 A1 | * | 9/2007 | Meunier | 701/16 |
| 2008/0249675 A1 | * | 10/2008 | Goodman et al. | 701/16 |
| 2009/0292433 A1 | * | 11/2009 | Goodman et al. | 701/70 |

FOREIGN PATENT DOCUMENTS

| | | |
|---|---|---|
| FR | 2817979 | 6/2002 |
| FR | 2897593 | 8/2007 |

OTHER PUBLICATIONS

European Patent Office, International Search Report PCT/FR2009/001088, Feb. 2, 2010 (English, 2 pgs) (French, 2 pgs).

* cited by examiner

*Primary Examiner* — Tan Q Nguyen
(74) *Attorney, Agent, or Firm* — Wood, Herron & Evans, LLP

(57) ABSTRACT

A method and device for aiding the piloting of an aircraft during a landing phase enables an appropriate braking mode to be selected for use with an automatic braking system. The device includes a minimum braking distance estimation device that determines a minimum braking distance required using a currently selected braking mode, and also includes an alarm device for alerting the crew, during a landing, of the selecting of an insufficient braking mode on an automatic braking system. The crew may then take an appropriate action at a mode selection input device.

16 Claims, 3 Drawing Sheets

METHOD AND DEVICE FOR AIDING THE PILOTING OF AN AIRCRAFT DURING A LANDING

This application claims priority, under Section 371 and or as a continuation under Section 120, to PCT Application No. PCT/EP2009/001088, filed on Sep. 14, 2009, which claims priority to French Application No. 08 05067, filed on Sep. 16, 2008.

TECHNICAL FIELD

The present invention relates to a piloting assistance process and device for an aircraft, in particular a civil transport airplane, upon a landing phase, said aircraft being provided with an automatic braking system being able to automatically brake the aircraft on the ground depending on a selected braking mode.

BACKGROUND

It is known that, upon running on a landing runway further to a landing (or a decision to interrupt a take-off), the deceleration (or the braking) of an aircraft is achieved, either manually and directly by the pilot using the brake pedals, or by an automatic braking system slaving a fixed deceleration, preselected by the pilot before landing, via a push button or an electromagnet rotary button, according to one of a plurality of different braking modes.

Now, such braking systems, either manual or automatic, have no awareness of the topographic reality of the landing runway (length, width, etc.) on which the landing is achieved.

From FR-2,817,979 and FR-2,857,468, devices are known for automatically controlling the deceleration of an aircraft upon a running phase, allowing such a drawback to be partially overcome. Such known devices allow, indeed, the crew of an aircraft to select an exit on the landing runway and to manage, automatically and optimally (assistance to selecting an exit being realistic and compatible with the known landing performance, minimization of the occupation time for the runway, minimization of the required braking energy, improvement of the comfort) the deceleration of the aircraft upon running at landing, until the selected exit is reached. Consequently, in normal operational conditions, optimally reaching such an exit occurs by means of such usual devices.

Furthermore, it is known from FR-2,897,593 a process and a system for supplying, upon a landing, right before the aircraft contacts the landing runway, a piece of information whether landing will be long or not, leaving time (if applicable) to take actions allowing the drawbacks of a long landing to be overcome. To this end, the altitude of the aircraft is measured, the horizontal distance separating said aircraft from the proximal end threshold of the landing runway is calculated, and, from this altitude and this horizontal distance, as well as from an approach angle, an estimated ending position is determined of said aircraft on said landing runway.

Moreover, US-2004/0,167,685 contemplates calculating a critical point on the landing runway, beyond which landing can lead to the runway being passed, and emitting a warning if the current descent axis of the aircraft reaches the runway beyond this critical point.

The present invention, more particularly, aims at warning the crew of the aircraft (being provided with an automatic braking system) against a risk of longitudinal runway excursion, upon running on this runway upon landing.

It is known that, upon landing, a problem may occur at the level of the normality of the landing conditions and their management by the crew of the aircraft. Indeed, before starting a flight, the crew should make sure that landing of the aircraft on the destination airport is possible, that is, that the expected landing performance, combined with expected exogenous conditions (meteorology, knowledge of the destination airport, the crew's experience, etc.) are compatible with the length of the landing runway available at the level of said destination airport.

However, it is possible that meteorological conditions become altered while landing is performed (occurrence of heavy rains, high wind gradients, etc.) making then difficult for the crew to perform landing until the aircraft stops on the available length of the landing runway being used (or even, obtaining a speed being compatible with taking an exit the aircraft is supposed to follow). Under such conditions, a risk of longitudinal runway excursion could become significant.

Now, such a risk of a runway excursion is nowadays integrally managed by the crew, without any assistance, nor automation, thanks to their experience, their training and a good preliminary preparation of the flight, which is not satisfactory.

In addition, when the aircraft is provided with an automatic braking system, it is possible, in particular considering the previous conditions, that the crew selects on said automatic braking system an inappropriate braking mode. The most problematic case is the selection of an insufficient braking mode (that is, generating too low a deceleration), that could in particular increase the risk of a runway excursion if the pilot does not react on time upon running.

The present invention aims at solving these drawbacks. It relates to an assistance process for piloting an aircraft upon a landing phase, allowing, in particular, the crew of the aircraft to be warned against a risk of longitudinal runway excursion upon running on this runway, said aircraft being provided with an automatic braking system that is able to brake automatically the aircraft on the ground depending on a selected braking mode, said automatic braking system comprising a plurality of different braking modes respectively performing different strength brakings.

SUMMARY OF THE INVENTION

To this end, according to this invention, the process is remarkable in that:

a) one of said landing runways of the airport is determined, being intended for landing of the aircraft;

b) characteristics of the landing runway determined in step a) are automatically determined;

c) repeatedly, the current position of the aircraft is automatically determined in a reference point connected to said determined landing runway; and d) as soon as the aircraft reaches a given height [for example 500 feet (about 150 metres)] above said determined landing runway, automatically:

d1) through said current position, a standard descent plane toward said landing runway and a performance model of the aircraft being calibrated on the braking capacity of the braking mode currently selected on said automatic braking system, a minimum braking distance is estimated, representing the distance along the landing runway until the aircraft stops on this landing runway;

d2) this minimum braking distance is compared to the length of said determined landing runway; and d3) if said minimum braking distance is higher than the length of the determined landing runway, and as long as this is the case, at least one (visual and/or sound) alarm is automatically emitted in the cockpit of the aircraft for informing the crew that the braking capacity of the braking mode currently selected on said automatic braking system will not be sufficient for safely stopping the aircraft on said landing runway and leading them to select on said automatic braking system, a braking mode having a higher braking strength than that of said currently selected braking mode.

Thus, thanks to this invention, in the case of a risk of longitudinal excursion from the (determined and effectively used) landing runway upon using an automatic braking system on the aircraft, that is when the minimum braking distance of the aircraft (depending on the braking capacities of the currently selected braking mode on the automatic braking system) is higher than the length of such a runway, the crew of the aircraft is warned, and this, by means of a visual and/or sound alarm. Moreover, such alarm(s) is or are emitted as long as the risk of a runway excursion remains.

In a particular embodiment, the currently selected braking mode is compared to the maximum braking mode of the automatic braking system, and in step d3), said alarm is emitted only if said currently selected braking mode does not correspond to said maximum braking mode, that is, an alarm is not emitted if the maximum braking mode is currently selected on the automatic braking system.

Moreover, in a preferred embodiment, if, at the end of a predetermined period of time after an alarm has been emitted in step d3), the crew has not selected another braking mode, a braking mode is automatically selected, in a step d4) on said automatic braking system, such a braking mode having a higher braking strength than that of said currently selected braking mode. Advantageously, such an automatic selection in step d4) occurs step by step:
  a) automatically selecting the braking mode with a braking strength immediately higher than that of the current braking mode; and
  b) automatically checking whether such a selected braking mode is sufficient for safely stopping the aircraft on the landing runway,
steps a) and b) being automatically repeated until a sufficient braking mode is obtained in step b), such a sufficient braking mode being then selected automatically on said automatic braking system of the aircraft.

Furthermore, advantageously, at least step d3) is automatically inhibited (relative to the emission of an alarm), from a given flight height (of the aircraft) above the landing runway, and this until said automatic braking system is activated. Thus, the crew is not disturbed in such a critical landing phase.

Furthermore, advantageously, said performance model depends on an estimated (dry, wet, contaminated) state of the landing runway, as selected for example by the pilot of the aircraft.

Moreover, advantageously, in step d1), for estimating the minimum braking distance, the following operations are performed:
  through the current position of the aircraft compared to the standard descent plane, a distance APD is calculated being relative to an air phase above the landing runway;
  by means of said performance model, a ground running distance GPD is calculated between touching the ground by the aircraft and the final stop of said aircraft; and
  the sum of said distances APD and GPD is calculated for deducting therefrom said minimum braking distance.

Preferably, said distance GPD is calculated using a network of neurons.

Moreover, for refining calculations, advantageously, in step d1), said minimum braking distance is increased if the aircraft is located above the standard descent plane and reaches the latter beyond the threshold of the landing runway.

Furthermore, advantageously, on an airport map displayed on a display screen of the cockpit, a symbology (with variable shape and/or colour) is presented, illustrating said minimum braking distance. In addition, such a symbology varies as a function of the difference between said minimum braking distance and said determined length of the landing runway, that is, as a function of the risk of a longitudinal runway excursion.

Furthermore, in a particular embodiment, between the above-mentioned steps c) and d), an intermediary step is carried out, comprising checking that the aircraft is actually landing on the landing runway determined in step a). Such an intermediary step is implemented when the aircraft is located at a predetermined radioaltimetric height, for example 500 feet (about 150 metres). Such an intermediary step could, more specifically, consist in checking:
  that the angular deviation between the magnetic orientation of the determined landing runway and the usual magnetic itinerary of the aircraft is actually lower than a predetermined threshold value, for example 5°; or
  that the metric deviation between the lateral position of the aircraft and the axis of the determined landing runway is actually lower than a predetermined threshold value, for example 300 metres.

Within the scope of the present invention, in step a), the landing runway to be used for landing of the aircraft on the airport (being provided with a plurality of landing runways) could be selected manually by a crew member, including using an interactive interface means. However, in a preferred embodiment, said landing runway is automatically determined. To this end, advantageously, the following string of operations is automatically performed:
  a1) for each one of said landing runways of the airport, the coordinates of the threshold of the corresponding landing runway are determined, as well as the orientation thereof;
  a2) it is repeatedly checked, whether a characteristic height depending on the current altitude of the aircraft and on the altitude of the airport is located within a (predetermined) height detection window;
  a3) as soon as said characteristic height is located within said detection window, for each one of said landing runways, an angular deviation is repeatedly calculated between the geographical orientation of the corresponding landing runway and a line crossing both the current position of the aircraft and the threshold of this landing runway, taking into consideration the information determined in step a1), such angular deviations being calculated for each landing runway repeatedly, and this until said characteristic height is again located outside said detection window; and
  a4) at that time, one of said landing runways is determined taking into consideration the different angular deviations calculated in step a3).

In such a case, advantageously, in step a1), the orientation of a landing runway is determined from the latitude and longitude coordinates of the threshold (or upstream end) of this landing runway and from the latitude and longitude coordinates of the end (or downstream end) of this landing runway.

Moreover, advantageously, in step a2):
as a characteristic height, the median value is determined between the following values: Hp-Ha, Hra and H0, with:
  Hp the usual baro-inertial altitude of the aircraft;
  Ha the altitude of the airport;
  Hra the current radioaltimetric altitude of the aircraft; and
  H0 a predetermined height value; and
it is checked whether such a characteristic height is located within said detection window that is limited by two predetermined, minimum and maximum, height values.

Moreover, advantageously, in step a3), said angular deviation is calculated for any landing runway with an index k, taking into consideration an orientation θAMk being calculated from the following expressions:

$$\text{if } \sin(\mu AC - \mu THRk) < 0, \theta AMk = \arccos\left(\frac{\sin(\lambda AC) - \sin(\lambda THRk) \cdot \cos(\rho AMk)}{\sin(\rho AMk) \cdot \cos(\lambda THRk)}\right)$$

$$\text{Otherwise, } \theta AMk = 2\pi - \arccos\left(\frac{\sin(\lambda AC) - \sin(\lambda THRk) \cdot \cos(\rho AMk)}{\sin(\rho AMk) \cdot \cos(\lambda THRk)}\right)$$

$$\rho AMk = 2 \cdot R \cdot \arcsin\sqrt{\sin^2\left(\frac{\lambda THRk - \lambda AC}{2}\right) + \cos(\lambda THRk) \cdot \cos(\lambda AC) \cdot \sin^2\left(\frac{\mu THRk - \mu A}{2}\right)}$$

wherein:
  λTHRk and μTHRk are the latitude and the longitude coordinates of the threshold of said landing runway with an index k
  λAC and μAC are the usual latitude and longitude coordinates of the aircraft; and
  R is the radius of the earth.

Moreover, advantageously, in step a4):
  the cumulative mean is calculated, for each landing runway, of all the corresponding angular deviations calculated in step a3);
  the different cumulative means being thus calculated are compared therebetween; and
  as a landing runway, the one with the lowest cumulative mean is determined.

In a particular embodiment, in step a), the aim of the automatic determination is to confirm a preliminary manual determination of the landing runway, carried out by an operator (a crew member of the aircraft).

The present invention also relates to a piloting assistance device of an aircraft, in particular of a civil transport airplane, upon a landing phase (in the final flight before the actual braking start upon running on the ground), said aircraft being provided with an automatic braking system being able to automatically brake the aircraft on the ground as a function of a selected braking mode, said automatic braking system comprising a plurality of different braking modes respectively performing different strength brakings.

According to this invention, said device is remarkable in that it comprises:
  a runway determining device for determining, upon the landing phase, one of the landing runways of the airport, being intended for landing;
  a device for automatically supplying characteristics of the determined landing runway;
  a device for automatically determining the current position of the aircraft in a reference point connected to said determined landing runway;
  a device for automatically estimating, as soon as the aircraft flies at a given height above said determined landing runway, by said current position, a standard descent plane toward said determined landing runway and a performance model of the aircraft being calibrated on the braking capacities of the currently selected braking mode on said automatic braking system, a minimum braking distance representing the distance along the landing runway until the aircraft stops on this landing runway;
  a device for comparing automatically such a minimum braking distance to the length of the determined landing runway; and
  a device to be activated being able to emit automatically at least one alarm in the cockpit of the aircraft for informing the crew that the braking capacity of the currently selected braking mode (on said automatic braking system) will not be sufficient for safely stopping the aircraft on the landing runway and leading the crew to select, on said automatic braking system, a braking mode having a higher braking strength than that of said currently selected braking mode, said device being activated when said minimum braking distance is higher than the length of the determined landing runway, and as long as this is the case.

Moreover, advantageously, said device further includes:
  a device for automatically reconfiguring the automatic braking system; and/or
  a device able to inhibit at least said alarm emission device.

Furthermore, in a preferred embodiment, said runway determining device is intended for determining automatically a landing runway of the airport (being provided with a plurality of landing runways), and the runway determining device includes, to this end, advantageously:
  a first device for determining automatically, upon a landing phase, for each one of the landing runways of the airport, the coordinates of the threshold of the corresponding landing runway, as well as the orientation thereof;
  a second device for repeatedly checking, whether a characteristic height depending on the current altitude of the aircraft and on the altitude of the airport is located within a predetermined height detection window;
  a third device for calculating, repeatedly, as soon as said characteristic height is located within said detection window, for each one of said landing runways, an angular deviation between the geographical orientation of the corresponding landing runway and a line crossing both the current position of the aircraft and the threshold of this landing runway, taking into consideration the information determined by said first device, such angular deviations being calculated for each landing runway repeatedly, and this until said characteristic height is again located outside said detection window; and
  a fourth device for determining one of said landing runways, taking into consideration the angular deviations calculated by said third device.

BRIEF DESCRIPTION OF DRAWINGS

The FIGS. of the appended drawing will better explain how this invention can be implemented. In these FIGS., like reference numerals relate to like components.

The FIGS. of the appended drawing will better explain how this invention can be implemented. In these FIGS., like reference numerals relate to like components

DETAILED DESCRIPTION

Figure 1:
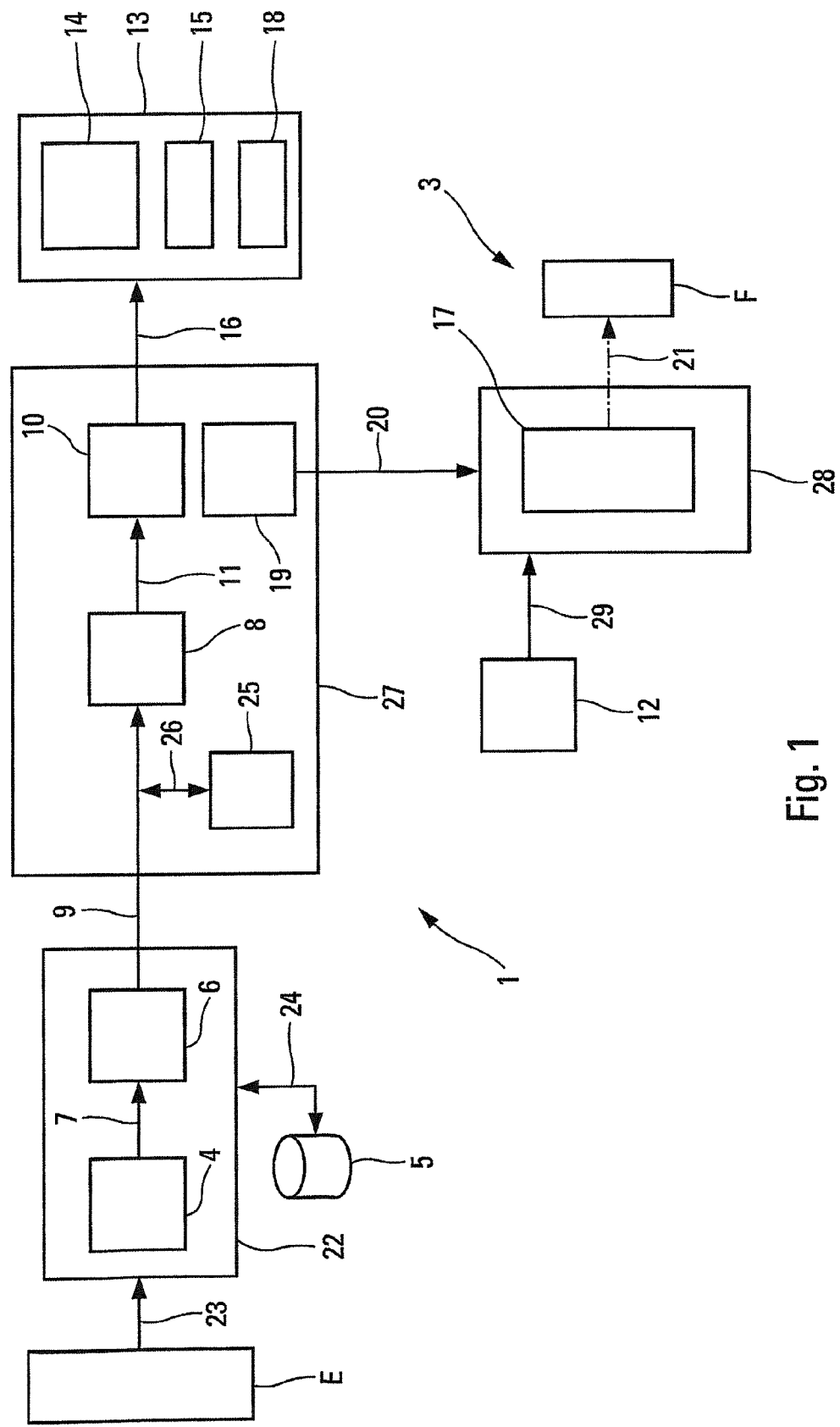
FIG. 1 is the block-diagram of a piloting assistance device according to the invention.

The device 1 according to this invention and schematically shown on FIG. 1, is intended for assisting piloting an aircraft A, in particular a civil transport airplane, upon a landing phase including:

a final approach towards an airport;

a landing as such on a landing runway 2 of this airport; and a running phase on this landing runway 2 after such a landing.

The present invention is applied to an aircraft A being provided with an automatic braking system 3 (being part of said device 1). Usually, when it is activated, such an automatic braking system 3 automatically actuates braking members F, such as the brakes of the aircraft A, including with the aim to brake the aircraft A upon running on the ground. The braking strength (that is the extent of the braking order applied to said braking members F) depends on a braking mode being preliminarily selected, amongst a plurality of possible braking modes. To this end, the braking system 3 usually includes a mode selection input device 12 allowing a crew member to select manually one of the possible braking modes.

Figure 2:
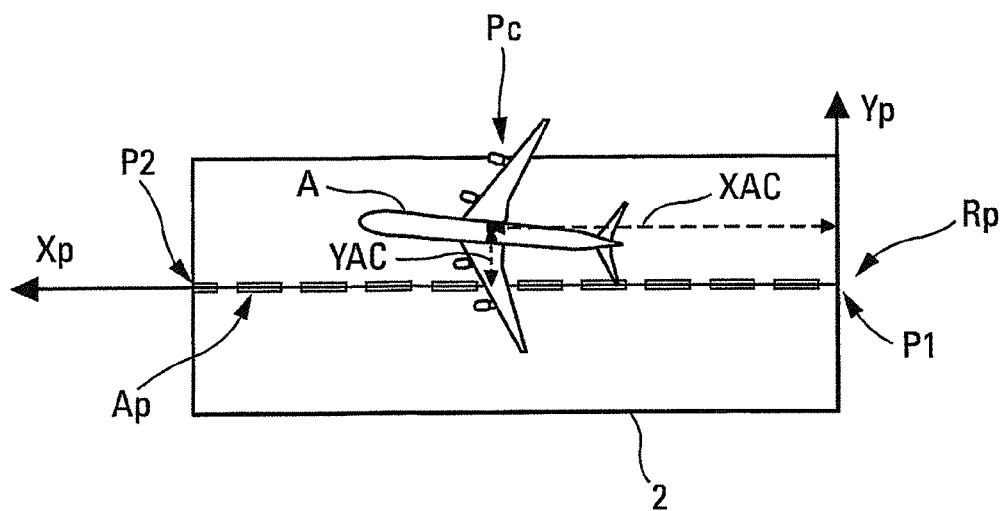
FIG. 2 schematically illustrates a running phase of an aircraft on a landing runway upon a landing phase.

According to the invention, said device 1 further comprises, as shown on FIG. 1:

a set E of usual sources of information, being able to determine the current values of different parameters (position, altitude, etc.) of the aircraft A, to be further detailed below;

a runway determination device 4 for determining a landing runway of the destination airport upon the landing phase, such a destination airport being provided with a plurality of different landing runways;

a data base 5 comprising characteristics of all landing runways at least of the expected destination airport and allowing to supply characteristics (to be further detailed below) of the landing runway 2 determined by the device 4;

a current position determination device being connected via a link 7 to the runway determination device 4 and being able to determine the current position Pc of the aircraft A, in a reference point Rp connected to the determined landing runway 2 and shown on FIG. 2;

a minimum braking distance estimation device 8 being connected via a link 9 to a current position determination device 6 and being formed so as to estimate, as soon as the aircraft A reaches a given height above the level of the determined landing runway 2 [for example 500 feet (about 150 meters)], a minimum braking distance LD representing the distance along the landing runway 2 until the aircraft A stops on this landing runway 2, as specified below. a minimum braking distance estimation device 8 estimates this minimum braking distance LD, using the usual position Pc determined by a current position determination device 6, of a standard descent plane toward the determined landing runway 2, and a performance model of the aircraft A (being calibrated on the breaking capacities of the current braking mode, that has been preselected by a crew member on the automatic braking system 3 using a mode selection input device 12). To this end, the device 1 comprises non shown devices being integrated for example into the system 3, for determining the braking mode that is currently selected and for transmitting such a piece of information to a minimum braking distance estimation device 8;

a comparing device 10 being connected via a link 11 to a minimum braking distance estimation device 8 and being intended for comparing the minimum braking distance LD determined by the minimum braking distance estimation device 8 to the length LRWY of the landing runway 2, received from the data base 5; and an alarm device 13 able to be activated, as specified below, that are able to emit automatically (when activated) a visual and/or sound alarm in the cockpit of the aircraft A in order:

to inform the crew that the braking capacity of the currently selected braking mode on said automatic braking system 3 will not be sufficient for safely stopping the aircraft A on said landing runway 2; and to lead them to select, on said automatic braking system 3, a braking mode with a higher braking strength than that of said currently selected braking mode.

The alarm device 13 is only activated (automatically) when the comparing device 10 informs (via a link 16) that the minimum braking distance LD is higher than the length LRWY of the landing runway 2, and as long as this remains the case.

Such (an) alarm(s) against a risk of a runway excursion are, preferably, activated after a predetermined period of time (corresponding to confirmation period of time) after the comparing device 10 has detected that the minimum braking distance LD is higher than the length LRWY of the landing runway 2.

The alarm device 13 is able, more specifically, to generate:

a visual alarm on a display screen 14 including in the cockpit via a text message such as "Increase Auto-Brake Setting" [in particular on a display of the PFD or ND type] or by a non shown indicator light; and a sound alarm through usual speakers 15 (in the form of a continuous or repeated audio message of the "Increase Auto-Brake Setting" type). Such a sound alarm could be a vocal alarm, or even any other type of sound that is emitted in the aircraft A.

Thus, thanks to this invention, upon a risk of a longitudinal excursion from the (determined and effectively used) landing runway 2 in the case where an automatic braking system 3 is used on the aircraft A, that is when the minimum braking distance LD of the aircraft A (depending on the braking capacities of the currently selected braking mode on the automatic braking system 3) is higher than the length LRWY of this runway 2 and that the standstill of the aircraft A will therefore occur longitudinally, beyond the downstream end P2 of the runway 2, the device 1 warns the crew of the aircraft A of the existence of such a risk, and this via a visual and/or a sound alarm. Moreover, such alarm(s) is or are emitted as long as the risk of a runway excursion remains.

The device 1 further comprises an inhibition device 18 that is able to inhibit automatically the alarm device 13. Preferably, the inhibition device 18 inhibits automatically the alarm device 13, as soon as the aircraft A flies down upon the descent at a given flight height [for example as soon as entering a flare landing, that is generally about 50 feet (15 meters) of height] above the landing runway 2, and such an inhibition is implemented until the automatic braking system 3 is activated upon running on the ground. The automatic braking system 3 starts to implement the braking mode as soon as it has been activated, such a braking being achieved depending on the braking mode preliminarily selected on the automatic braking system 3. Thus, the device 1 does not disturb the crew of the aircraft A in this flight phase, corresponding to the landing as such, which is a critical phase.

In a particular embodiment, the device 1 according to this invention also comprises devices (not shown) for comparing the currently selected braking mode to the maximum braking mode (that is generating the maximum braking strength) of the automatic braking system 3, and the automatic braking system 13 is activated so as to emit an alarm, only when the currently selected braking mode does not correspond to the maximum braking mode. The device 1 therefore does not emit an alarm if the maximum braking mode is already selected on the automatic braking system 3.

The device 1 further includes an automatic reconfiguration device 19 being associated with the automatic braking system 3, as illustrated via a link 20, with the aim to reconfigure it. More precisely, if, at the end of predetermined period of time after an alarm has been emitted by the alarm device 13, the crew has not selected another braking mode, the automatic reconfiguration device 19 selects automatically, on the automatic braking system 3, a braking mode with a higher braking strength than that of the currently selected braking mode.

In a preferred embodiment, said automatic reconfiguration device 19 is formed so as to achieve such an automatic selection step by step, and the automatic configuration device 19 includes, to this end, an integrated device (not shown):

a) for automatically selecting the braking mode with a braking strength immediately higher than that of the current braking mode being either the currently selected braking mode, or the braking mode selected in the previous step a); and b) for checking automatically after an adjustable confirmation period of time (for example one second) whether this selected braking mode is sufficient for safely stopping the aircraft A on the landing runway 2.

The successive steps a) and b) are repeated automatically until a sufficient braking mode is achieved in step b), such a sufficient braking mode being then selected automatically on the automatic braking system of the aircraft A, using the automatic braking system 3 cooperating with the automatic reconfiguration device 19.

In a preferred embodiment, the automatic breaking system 3 further includes:

a braking order determination device 17 determining automatically a braking order to transmit to the braking members F, including to the brakes of the aircraft A, as illustrated 21 in mixed lines;

a computer 28 including a braking order determination device 17;

a mode selection input device 12, for example a rotary button or a push-button, allowing a crew member to select manually a braking mode and being, for example, connected via a link 29 to the computer 28; and an activation device allowing the automatic braking system 3 to be activated.

In a preferred embodiment:

the runway determination device 4 and the current position determination device 6 are part of a navigation computer 22 being connected via a link 23 to the set E of sources of information, and via a link 24 to the data base 5 being associated therewith. Such a navigation computer 22 could be a "Flight Management System" being so-called FMS or an "Airport Navigation System" being so-called ANS. If the navigation computer 22 is a flight management system, the data base 5 is a usual navigation data base, and if the navigation computer 22 is an airport navigation system, the data base 5 is a usual airport data base;

the alarm device 13, provides the above-mentioned warnings and messages, are part of a "Flight Warning Computer" being so-called FWC;

the minimum braking distance estimation device 8, the comparing device 10 and the automatic reconfiguration device 19, as well as a runway checking device 25 to be further detailed below, are part of a usual piloting and guiding computer 27, such as an autopilot; and the braking order determination device 17 are part of a usual braking computer 28.

Moreover, in a non shown particular embodiment, the minimum braking distance estimation device 8, the comparing device 10, the braking order determination device 17, the automatic reconfiguration device 19 and the runway checking device 25 could also be part of one single usual braking computer.

It should be noticed that, in the case where the device 1 has available a man/machine interface allowing to select the estimated state of the landing runway 2, the generation of the alarm and the automatic reconfiguration are achieved assuming that the state of the runway 2 is that being selected. Should this not be the case, a conservative hypothesis is taken into consideration, according to which the runway 2 is wet or contaminated.

It is known that the destination airport could be provided with several landing runways, and at first sight, the landing runway that will be actually used is not known. The latter could be determined:

either by the (latitude and longitude) coordinates of the threshold P1 and the end P2 of this runway 2, from which its length and its magnetic orientation can then be deducted;

or by the (latitude and longitude) coordinates of the threshold P1, the length LRWY and the magnetic orientation of this runway 2.

As a result, two solutions are available for determining the landing runway to be used;

either such a runway is selected by the pilot preliminarily and it is assumed that the aircraft A will land on such a preselected runway;

or such a runway is automatically detected, analyzing the position of the aircraft A upon the landing phase until in the vicinity of the ground, with respect to all possible landing runways, being listed in the data base 5 (navigation, airport, . . . ), as further detailed below.

Knowing the (preselected or automatically detected) landing runway 2, it becomes possible to position the aircraft A with respect to this landing runway 2 via a direct orthonormal reference point, the origin of which is the threshold P1 of this runway 2 and the longitudinal axis of which is the axis Ap of this runway 2. It is also possible to position the aircraft A with respect to a nominal or standard descent plane [in general of the order of a slope of 3° ending at 50 feet (about 15 metres) from the threshold P1 of the runway 2].

The device 1 according to this invention also includes a runway checking device 25 being, for example, connected via a link 26 to link 9 and being provided for checking whether the aircraft A is actually landing on the landing runway 2 determined by the runway determination device 4. As the runway checking device 25 is part of a computer 27 being independent from the navigation computer 22, the device 1 is able to check the likelihood of the landing runway 2 determined by the runway checking device 4 (being integrated into the navigation computer 22) by independent methods, allowing to increase the reliability of the determination. The runway checking device 25 thus allows to improve the operating safety of the protection against a risk of a runway excursion.

To this end, the runway checking device 25 has available:

the magnetic orientation of the landing runway 2 (QFU), being either issued from the data base 5, or calculated as set forth below;

the lateral position of the aircraft A (ordinate) in the orthonormal reference point Rp associated with the landing runway 2, being determined as further detailed below;

the usual radioaltimetric altitude of the aircraft A, being measured by devices being part of the set 3 of sources of information; and the current magnetic way followed by the aircraft A, being also measured by devices being part of the set 3 of sources of information.

Figure 3:
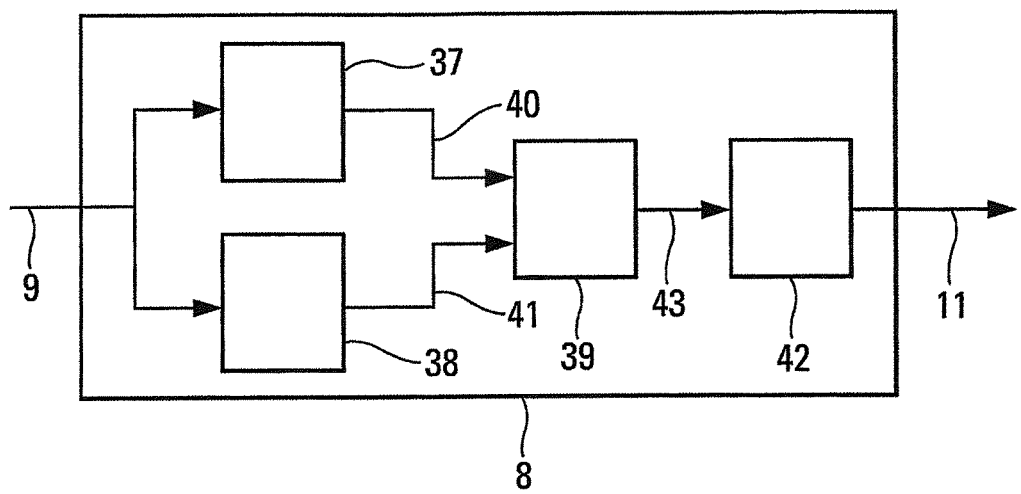
FIG. 3 schematically illustrates a calculation device being part of a piloting assistance device according to this invention.

The runway checking device 25 checks, when the aircraft A reaches a given radioaltimetric height upon the descent during the landing phase, for example at 500 feet (about 150 meters), if:

the angular deviation between the magnetic orientation of the determined landing runway 2 and the current magnetic way of the aircraft A is lower or not to a given absolute value threshold, for example 5°; or whether the metric deviation of the lateral position with respect to the axis Ap (shown in dashed lines on FIG. 3) of the determined landing runway 2 [equal to the lateral position of the aircraft (ordinate) in the orthonormal reference point Rp connected to the determined landing runway 2] is higher or not than an absolute value given threshold, for example 300 metres.

Indeed, it is assumed that the aircraft A is aligned on the axis Ap of the runway 2, under a height of 500 feet with respect to the effective altitude of the landing runway 2. Thanks to the check as implemented by the runway checking device 25, the device 1 is able to check that the aircraft A actually lands on the determined landing runway 2.

Determining a landing runway 2, as implemented by the runway determination device 4 and to be further detailed below, allows a request to be initiated to the data base 5. Such a request allows the characteristics of the thus determined landing runway 2 to be recovered. Two types of characteristics then exist as a function of the type of data base 5. More precisely:

A/if the data base 5 is a navigation data base, the data base 5 contains the latitude and longitude coordinates of the threshold P1 (upstream end) of the runway 2, as well as the length and the magnetic orientation (QFU) of this runway 2;

B/if the data base 5 is an airport data base, the data base 5 contains the latitude and longitude coordinates of the threshold P1 of the runway 2, as well as the latitude and longitude coordinates of the end P2 (downstream end) of this runway 2 (FIG. 2).

The orientation of the runway 2 corresponds:

in the previous case A, to the magnetic orientation of the landing runway 2 being usually captured by the crew from the data base 5 via a flight management system upon preparing the flight; and in the previous case B, to the geographic orientation of the landing runway 2 being calculated from the geographic coordinates of the landing runway 2 issued from the airport data base.

In such a case B, such an orientation QFU is calculated from latitude and longitude coordinates according to the norm WGS 84 of the threshold P1 ($\lambda THR$, $\mu HR$) of the runway 2 and of the end P2 ($\lambda END$, $\mu END$) OF THE runway 2. Such a calculation is such that:

$$^{if} \sin(\mu END - \mu THR) < 0,$$

$$^{then} QFU = \arccos\left(\frac{\sin(\lambda END) - \sin(\lambda THR) \cdot \cos(LRWY)}{\sin(LRWY) \cdot \cos(\lambda THR)}\right)$$

$$^{if} \sin(\mu END - \mu THR) \geq 0,$$

$$^{then} QFU = 2\pi - \arccos\left(\frac{\sin(\lambda END) - \sin(\lambda THR) \cdot \cos(LRWY)}{\sin(LRWY) \cdot \cos(\lambda THR)}\right)$$

In these expressions, LRWY is the length of the runway 2, in metres, calculated as follows:

$$LRWY = 2 \cdot R \cdot \arcsin\sqrt{\sin^2\left(\frac{\lambda THR - \lambda END}{2}\right) + \cos(\lambda THR) \cdot \cos(\lambda END) \cdot \sin^2\left(\frac{\mu THR - \mu END}{2}\right)}$$

with R the radius of the earth, in metres.

The current position determination device 6 can then calculate the coordinates of the position of the aircraft A in the orthonormed reference point Rp associated with the determined landing runway 2. The longitudinal position of the aircraft A on the landing runway 2 corresponds to the abscissa XAC of the position of the aircraft A in this orthonormed reference point Rp, as shown on FIG. 2.

The lateral position of the aircraft A in the reference point Rp (having a longitudinal axis Xp in abscissa and a lateral axis Yp in ordinate and being defined with respect to the threshold P1 of the runway 2) is calculated from the following expressions:

$$\begin{cases} XAC = \rho AM \cdot \cos(\theta AM - QFU) \\ YAC = \rho AM \cdot \sin(\theta AM - QFU) \end{cases}$$

wherein:

XAC is thus the longitudinal position of the aircraft A in the reference point Rp, expressed in metres;

YAC is the lateral position of the aircraft A in the reference point Rp, expressed in metres;

$\rho AM$ is the distance of the aircraft A with respect to the threshold P1 of the runway 2, expressed in metres;

$\theta AM$ is the geographic course of the aircraft A, expressed in degrees; and QFU is the geographic course of the runway 2, expressed in degrees, and obtained as described above.

The distance $\rho AM$ of the aircraft A with respect to the threshold P1 of the runway 2 is calculated from current coordinates $\{\lambda AO, \mu AO\}$ of the aircraft A, preferably of the GPS type, and from geographic coordinates $\{\lambda THR, \mu THR\}$ of the threshold P1 of the runway 2 (issued from the data base 5):

$$\rho AM = 2 \cdot R \cdot \arcsin\sqrt{\sin^2\left(\frac{\lambda THR - \lambda AC}{2}\right) + \cos(\lambda THR) \cdot \cos(\lambda AC) \cdot \sin^2\left(\frac{\mu THR - \mu AC}{2}\right)}$$

The geographic course $\Theta AM$ of the aircraft A is calculated from the GPS coordinates $\{\lambda AC, \mu AC\}$ of the aircraft A:

$$^{if} \sin(\mu AC - \mu THR) < 0, \theta AM =$$

$$\arccos\left(\frac{\sin(\lambda AC) - \sin(\lambda THR) \cdot \cos(\rho AM)}{\sin(\rho AM) \cdot \cos(\lambda THR)}\right)$$

$$^{Otherwise,} \theta AM = 2\pi - \arccos\left(\frac{\sin(\lambda AC) - \sin(\lambda THR) \cdot \cos(\rho AM)}{\sin(\rho AM) \cdot \cos(\lambda THR)}\right)$$

Furthermore, as soon as the aircraft A flies at a given height, for example at 500 feet (about 150 meters), above the level of the runway 2, the minimum braking distance estimation device 8 determines the minimum braking distance LD of the aircraft A. To this end, the minimum braking distance estimation device 8 includes, as shown on FIG. 3:

an air running distance calculation device 37 for calculating, using the current position Pc of the aircraft A with respect to the standard (or nominal) descent plane, a distance APD being related to an air phase above the landing runway 2;

a ground running distance calculation device 38 for calculating, using the performance model, a ground running distance GPD between the time when the aircraft A touches the ground and the final standstill of said aircraft A. The performance model depends on an estimated (dry, wet, contaminated) state of the landing runway, being for example selected by the pilot of the aircraft A; and a summing device 39 being connected via the links 40 and 41 respectively to the air running distance calculation device 37 and the ground running distance calculation device 38 and calculating the sum of said distances APD and GPD so as to obtain a minimum distance, from which the longitudinal distance is subtracted between the current position of the aircraft and the threshold of the runway so as to obtain the minimum braking distance.

In a preferred embodiment, the distance APD corresponds to the distance covered, in the air phase, by the aircraft A at the "True Air Speed" being so-called TAS, and this for a given period of time, for example for 5 seconds. Preferably, the air running distance calculation device 37 performs at least three different calculations, as a function of the height H of the aircraft A with respect to the landing runway 2, i.e.

a) for a height H higher than 500 feet (about 150 metres);

b) for a height H ranging between 500 feet and 50 feet (about 15 metres); and c) for a height H lower than 50 feet.

In the situation a), the air running distance calculation device 37 calculates the distance APD1 using the following expression:

$$APD1=(Vapp+WS) \cdot TAPD$$

wherein:

APD1 is therefore the distance (in metres) of the air phase for such a situation a);

TAPD is a characteristic time (in seconds) of such an air phase;

Vapp is the predicted approach speed of the TAS type, expressed in m/s; and

WS is the predicted longitudinal speed of the wind, being also expressed in m/s.

Moreover, this distance APD1 should meet the following condition:

$$APD1 > APDmin$$

where APDmin is a minimum value, expressed in metres.

In the situation b), the air running distance calculation device 37 calculates the distance APD2 using the following expression:

$$APD2=GS1 \cdot TAPD$$

wherein GS1 is the usual ground speed.

Such a distance APD2 should also meet the following condition:

$$APD2 > APDmin$$

Furthermore, in the situation c), the air running distance calculation device 37 calculates the distance APD3 using the following expression:

$$APD3=GS2 \cdot TAPD \cdot H/50$$

wherein:

GS2 is the ground speed (in m/s) that has been recorded at a height of 50 feet; and H is the current height of the aircraft A (in feet).

Furthermore, the following conditions should be met in such a situation c):

$$*GS2 \cdot TAPD > APDmin$$

$$*0 < H/50 < 1$$

In the previous expressions, the characteristic period of time TAPD of the air phase has a predetermined value, preferably 5 seconds, and the minimum distance APDmin also has a predetermined value, for example 400 metres.

Furthermore, the speed Vapp could be obtained from a speed Vappfms, and this, using two different methods. The speed Vappfms is a corrected speed of the Calibrated Airspeed or CAS being displayed on a usual approach performance page relative to a flight management system.

According to a first (preferred) method, this speed Vapp is calculated using the following expression:

$$Vapp=Vappfms \cdot \sqrt{\rho 0/\rho}$$

wherein:

Vappfms is thus the speed displayed on the approach performance page;

ρ is the density of the air at the destination airport; and

ρ0=1.225 kg/m³.

Furthermore, according to a second (simplified) method, the speed Vapp can be calculated using the following expression:

$$Vapp=Vappfms \cdot f(Zp)$$

wherein:

f(Zp) is a tabulated function of the geometric altitude of the airport, representing the ratio $\sqrt{\rho 0/\rho}$ (equal to 1 to 0 foot and 1.25 to 15,000 feet); and Zp is the predicted pressure altitude at the destination airport, expressed in feet.

Moreover, the above-mentioned speed WS is the speed of the longitudinal wind, being predicted along the axis Ap of the runway 2. Such a speed WS is deducted from values entered into the flight management system on the performance approach page, from the direction of the wind and the speed of the wind (entered by the crew on this page) and from the direction of the axis Ap of the landing runway 2, contained in the data base 5.

Additionally:

the speed GS1 is the measured current ground speed (in m/s), that can be more specifically calculated usually by an inertial system, optionally corrected using values issued from a satellite positioning system;

the speed GS2 is the measured usual ground speed at a height of 50 feet above the landing runway 2, such a speed being expressed in m/s; and the height H is the current height of the aircraft A, obtained by a radioaltimeter and expressed in feet.

Moreover, the ground running distance calculation device 38 calculates the distance GPD using a performance model of the aircraft A, being calibrated on the braking capacities of the currently selected braking mode on the automatic braking system 3, and depending on the estimated state of the runway 2. Such a state could, more specifically, be entered by the pilot, through a usual entry means (not shown). Within the scope of the present invention, the runway could, in particular, be dry, wet or contaminated (that is when more than 25% of the surface of the runway is covered by snow, ice or stagnant water).

The distance GPD represents the distance covered by the aircraft A between the moment where the main landing gear touches the landing runway 2 and the complete standstill on this runway 2.

Figure 4:
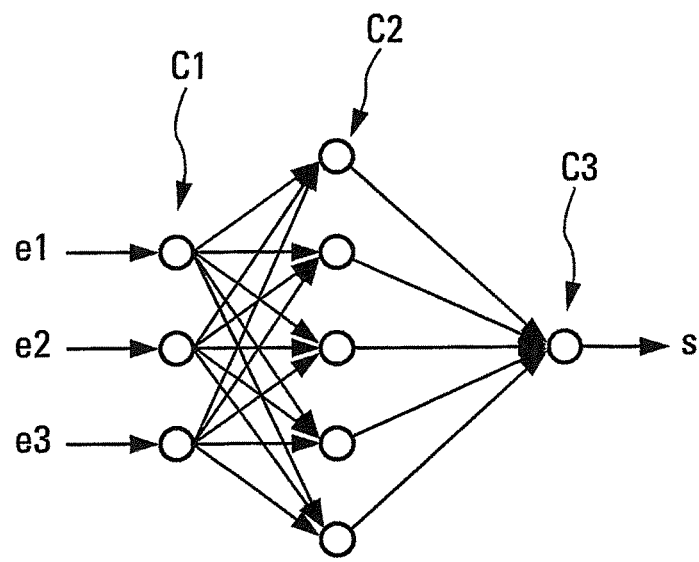
FIG. 4 is a diagram allowing to explain the operation of a network of neurons used by the calculation device on FIG. 3.

The ground running distance calculation device 38 uses a network of neurons, such as illustrated on FIG. 4. As known, such a network comprises a layer of entries C1 comprising a plurality of entries e1, e2, e3, etc. (of values xi), an intermediary layer C2 (of values si,j), and an outlet layer C3 supplying the outlet value s. The model to be used has the following characteristics:

$$\begin{cases} xi = ei, j \\ si, 1 = \alpha i \cdot ei, 1 + \beta i \\ sj, 2 = \theta\left(\sum_{i=1}^{ne} ai, j \cdot si, 1 + bj\right) \text{ avec} \theta(x) = x/(1+|x|) \\ s = \sum_{j=1}^{n} Cj \cdot sj, 2 \\ y = (s - \beta O)/\alpha O \end{cases}$$

with $(\alpha i; \beta i)_{i=0,ne}$ such $\begin{cases} -1 \leq si, 1 \leq +1 \\ -1 \leq s \leq +1 \end{cases}$ Furthermore, the number N of coefficients is equal to:

$$\begin{cases} N = ^{number} (\alpha i; \beta i) +^{number} (ai, j; bj) +^{number} (cj) +^{number} (\alpha O; \beta O) \\ N = ne \cdot 2 + n \cdot (ne + 1) + n + 2 \\ N = n \cdot (ne + 2) + 2 \cdot (ne + 1) \end{cases}$$

The ground running distance calculation device 38 performs the calculations generally for two different heights H of the aircraft A, i.e.:
for a height H higher than 500 feet; and
for a height H lower than 500 feet.

The distance GPD depends on the aerodynamic configuration of the aircraft A, that is on the position of the slats and flaps upon landing.

The calculation is first presented regarding the distance GPD (referred to as GPD1) for a runway that is dry.

First, such a distance (referred to as GPD1a) is calculated for a very hyperlifted flight configuration, for which the slats and flaps are completely extended, and so-called "FULL". This distance GPD1a is calculated through a non linear method based on a network model using the following expression: GPD1a. Df1+AD1 wherein:
Df1 is the distance to the ground in the "FULL" configuration; and
AD1 is a predetermined value.

Second, such a distance (referred to as GPD1b) is calculated for a hyperlifted flight configuration corresponding to the configuration just before the "FULL" configuration, for which the flaps are not completely extended. In such a so-called "CONF 3" flight configuration, the distance GPD1b is deducted from the previous distance GPD1a, using the following expression:

$$GPD1b = GPD1a + AD2$$

wherein AD2 represents the difference of length for the ground phase between the two configurations to be considered. Such a value is preferably a predetermined value, for example 50 metres.

In such a case, the model to be used (for the network of neurons) comprises 6 entries (ne=6) regarding the following values (to be further detailed below):
the weight GW;
the temperature DISA;
the altitude Zp;
the ground speed GS;
the speed of the wind WS; and
the braking mode to be used.

In such a case, the network comprises 20 intermediary neurons in the layer C2 (n=20), and a number of 174 coefficients (N=174), i.e. 6 $\alpha i$, 6 $\beta i$, 120 ai,j, 20 bj, 20 cj, 1 $\alpha O$ and 1 $\beta O$. The network of neurons then supplies at the entry the above-mentioned distance Df1.

It should be noticed that, for a height H higher than 500 feet:
the weight GW is the landing weight estimated at the destination airport, such a weight being calculated by the flight management system and displayed on the approach performance page;
the temperature DISA is the predicted temperature difference at the destination airport, being expressed in °C. or in °K, between a temperature OAT (being the predicted temperature of the external air at the destination airport, being supplied by the flight management system) and a temperature TISA (being the temperature ISA at the pressure altitude of the airport). TISA is usually calculated;
the altitude Zp is the predicted pressure altitude at the destination airport, in feet;
the speed GS is the predicted ground speed, in knots;
the speed of the wind WS is the predicted longitudinal speed; and
the automatic braking mode to be used corresponds to that selected by a rotary button for selecting the automatic lock mode.

Moreover, for a height H lower than 500 feet:
the weight GW represents the current weight;
the temperature DISA represents the current difference of temperature ISA expressed in °C. or in °K, from the difference between the current temperature of the external air and the temperature ISA at the usual standard pressure altitude;
the altitude Zp is the measured current pressure altitude;
the ground speed GS is the measured current ground speed;
the speed of the wind WS is the current longitudinal speed of the wind, being usually measured; and
the automatic braking mode is the mode being currently selected.

the ground running distance calculation device 38 could calculate, using a similar network of neurons, the distance GPD (referred to as GPD2) for a wet runway.

In such a case, for a "FULL" configuration, said distance (referred to as GPD2a) is calculated using the following expression:

$$GPD2A = Df2 + AD3$$

wherein:

Df2 represents the ground distance in such a "FULL" configuration; and

ΔD3 represents a predetermined value.

Furthermore, in a "CONF3" configuration, the distance (referred to GPD2b) of the ground phase can be deducted from the previous distance GPD2a, using the following expression:

$$GPD2b=GPD2a+D4$$

wherein D4 represents the difference of length for the ground phase between the two configurations to be considered. Such a distance could be equal to 50 metres.

In such a case, for calculating the distance Df2, the entries to the network of neurons are similar to those for the previous distance Df1. As far as the entry of the network of neurons is concerned, it thus supplies such a distance Df2.

Furthermore, in a particular embodiment, the minimum braking distance estimation device 8 further includes a translation device 42 being, for example, connected via a link 43 to the summing device 39 and allowing to translate usual bars indicating, for example, on the display screen 14, the standstill position. Such translation device 42 increases the distances (for a dry runway and a wet runway) as a function of the current trajectory of the aircraft A at a height lower than 500 feet. Such distances are increased by a value ΔX in some particular conditions. In a particular embodiment:

if the aircraft A is located under a nominal slope (having a value of 3° and the origin of which is the point located at 50 feet above the threshold P1 of the landing runway 2), the distances are not increased;

otherwise:

if the point estimated at 50 feet ensuring that the aircraft A will follow a descent path of 4° is located upstream the landing runway 2, the distances are not increased;

otherwise, the distances are increased by the following distance ΔX:

$$\Delta X=0.3048\cdot(Z-50)/4+X$$

In this latter expression:

Z is the height (in feet) of the aircraft A above the landing runway 2; and

X is the longitudinal distance (in metres) of the aircraft A with respect to the threshold P1 of the runway.

Furthermore, in a particular embodiment, the device 1 can also comprise a (non shown) man/machine interface (display, etc.), allowing to position and to display in real time a symbol illustrating the current position Pc of the aircraft A on a map of the airport displaying the determined landing runway 2, for example of the "Electronic Moving Map" type. In such a case, the minimum braking distance LD could also be materialized by an appropriate symbology on the map of the airport making the crew aware of the risk runway excursion (or not). As an example, the symbol illustrating the current position Pc of the aircraft A could have the shape of a bar being orthogonal to the axis Ap of the runway 2 and moving along such an axis Ap. Such a symbol could be red in case of a risk of a runway excursion, and green in the case of the absence of a risk of a runway excursion.

Moreover, the comparing device 10 evaluate the risk of an excursion from the runway 2, comparing the minimum braking distance LD (estimated by the minimum braking distance estimation device 8) to the length LRWY of the landing runway 2. To this end, the comparing device 10 calculates the deviation Δ between the length LRWY (issued from the data base 5) of the landing runway 2 and the minimum braking distance LD, calculated by the minimum braking distance estimation device 8:

$$\Delta=LRWY-LD$$

If this deviation Δ is positive, the comparing device 10 concludes to an absence of passing the end P2 of the landing runway 2, thus to the absence of a risk of longitudinal runway excursion. On the other hand, if the deviation Δ is negative, the comparing device 10 detects a risk of longitudinal runway excursion.

Figure 5:
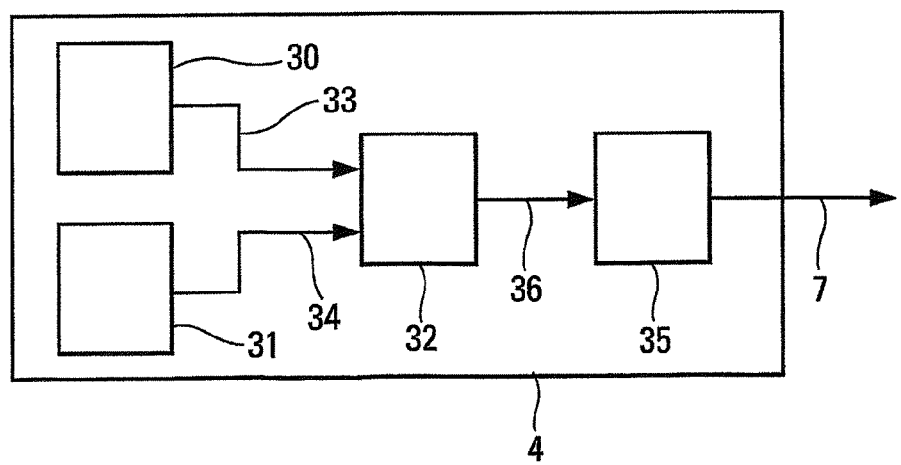
FIG. 5 is the block-diagram of a device for automatically detecting a landing runway being part of a piloting assistance device according to the invention.

Furthermore, the runway determination device 4 allowing a landing runway 2 to be determined of an airport provided with a plurality of landing runways, could, within the scope of the present invention:

either correspond to manual determination devices (not shown) such as an interactive interface device (designator, touch screen, accompanied with a dedicated screen) being associated with a navigation computer (for example of the FMC, ANC or TAWS type) and allowing a crew member to manually select a landing runway;

or by a device allowing to determine automatically a landing runway, as shown on FIG. 5.

In such a case, such a runway determination device 4 could:

either be used as such, for determining automatically the landing runway 2;

or be associated to manual determination means (not shown), allowing a crew member to manually determine a landing runway. In such a case, the runway determination device 4 aims at determining automatically a landing runway 2 being compared to a manually determined landing runway, so as to be able to confirm such a manual determination. Should there be a mismatch between a manual determination and an automatic determination, device (not shown) of the device 1 predict that the automatic determination implemented by the runway determination device 4 prevails.

As shown on FIG. 5, the runway determination device 4 includes, in a preferred embodiment:

a coordinate threshold determination device 30 for determining automatically, upon a landing phase on an airport provided with a plurality of landing runways, the coordinates of the thresholds of each one of these landing runways, as well as the orientation QFU thereof;

a height window checking device 31 for repeatedly checking, whether a characteristic height HAC depending on the current altitude of the aircraft A and on the altitude of the airport is located within a (predetermined) height detection window;

an angular deviation calculation device 32 being connected via links 33 and 34 respectively to the coordinate threshold determination device 30 and the height window checking device 31 and being formed so as to repeatedly calculate, as soon as said characteristic height HAC is located within said detection window, for each one of said landing runways, an angular deviation between the geographic orientation of the corresponding landing runway and a line crossing both the current position of the aircraft A and the threshold of this landing runway. Such calculations take into consideration the information determined by the coordinate threshold determination device 30. These angular deviations are, repeatedly, calculated by the angular deviation calculation device 32 (for each landing runway) and this until said characteristic height HAC is again located outside said detection window; and a runway detection device 35 being connected via a link 36 to the angular deviation calculation device 32 and being formed so as to determine one of said landing runways, taking into consideration the angular deviations calculated by the angular deviation calculation device 32, as detailed below, and to transmit it via the link 7.

The coordinate threshold determination device 30 receives the information recorded in the data base 5 and they create a sub-data base of the set of the landing runways of the airport. As previously set forth, such landing runways are listed in the data base 5:
- in the case of an airport data base, by the latitude and longitude coordinates of the threshold (upstream end) of the runway and of the end (downstream end) of the runway; and
- in the case of a navigation data base, by the latitude (λTHR) and the longitude (μTHR) coordinates of the threshold of the runway and of the magnetic orientation QFU thereof.

The coordinate threshold determination device 30 then creates a sub-data base of the data base 5 (relative to the airport and provided with a number n of landing runways, n being an integer higher than or equal to 2) being provided with n couples of coordinates ({λTHR, μTHR}, QFU).

Consequently, in the case of a navigation data base, such information is merely extracted from said data base 5. On the other hand, in the case of an airport data base, the coordinate threshold determination device 30 should calculate the orientation θFUk of each index k landing runway. Such a calculation is performed as follows:

$$\forall k \in [1, n], \text{ if } \sin(\mu ENDk - \mu THRk) < O,$$

$$QFUK = \arccos\left(\frac{\sin(\lambda ENDk) - \sin(\lambda THRk) \cdot \cos(LRWYk)}{\sin(LRWYk) \cdot \cos(\lambda THRk)}\right)$$

$$\text{Otherwise, } QFUK = 2\pi - \arccos\left(\frac{\sin(\lambda ENDk) - \sin(\lambda THRk) \cdot \cos(LRWYk)}{\sin(LRWYk) \cdot \cos(\lambda THRk)}\right)$$

$$LRWYk = 2 \cdot R \cdot \arcsin\sqrt{\sin^2\left(\frac{\lambda THRk - \lambda ENDk}{2}\right) + \cos(\lambda THRk) \cdot \cos(\lambda ENDk) \cdot \sin^2\left(\frac{\mu THRk - \mu ENDk}{2}\right)}$$

with R the radius of the earth (in metres).

In addition, the height window checking device 31 includes:
- a voter (not shown) being formed so as to determine, in real time, as a characteristic height HAC, the median value between the following values: Hp-Ha, Hra and HO, with:
  - Hp the usual baro-inertial altitude of the aircraft A (in reference QNH), in foot;
  - Ha the altitude of the airport (supplied by the data base 5), in feet;
  - Hra the usual radioaltimetric altitude of the aircraft A, in feet; and
  - HO a predetermined height value, for example 10,000 feet (about 3 km); and
- a device for checking whether such a characteristic height HAC is located in the detection window being limited by a minimum height value Hmin, for example 100 feet (about 30 meters), and by a predetermined maximum height value Hmax, for example 200 feet (about 60 meters).

Preferably, the height window checking device 31 allows for providing a Boolean unit authorizing a test phase implemented by the angular deviation calculation device 32 and a determination phase implemented by the runway selection device 35.

When the aircraft A is in an approach phase, two situations may occur:
- if HAC is higher than Hmax or lower than Hmin, then it is outside the detection window and the (authorization) Boolean unit is set to 0;
- otherwise, said Boolean unit is set to 1.

The angular deviation calculation device 32 allows for testing, when the authorization Boolean unit is at 1, the set of possible landing runways as listed in a sub-data base created by the coordinate threshold determination device 30. To this end, the angular deviation calculation device 32 calculates the angular deviation ξk[i] (between the geographic orientation of the runway 2 and the orientation of a line crossing the threshold P1 of the runway 2 and the current position Pc of the aircraft A), for any index k landing runway, at each calculation increment i of the runway determination device 4 (being supposed to implement ρ calculation increments while said Boolean unit is at 1), as follows:

$$\forall k \in [1, n], \forall i \in [O, p], \zeta k[i] = \theta AMk[i] - QFUk$$

$$\forall k \in [1, n], \forall i \in [O, p], \text{ si} \sin(\mu AC[i] - \mu THRk) < 0,$$

$$\theta AMk[i] = \arccos\left(\frac{\sin(\lambda AC[i]) - \sin(\lambda THRk) \cdot \cos(\rho AMk[i])}{\sin(\rho AMk[i]) \cdot \cos(\lambda THRk)}\right)$$

$$\text{sinon, } \theta AMk[i] = 2\pi - \arccos\left(\frac{\sin(\lambda AC[i]) - \sin(\lambda THRk) \cdot \cos(\rho AMk[i])}{\sin(\rho AMk[i]) \cdot \cos(\lambda THRk)}\right)$$

$$\rho AMk[i] = 2 \cdot R \cdot \arcsin\sqrt{\sin^2\left(\frac{\lambda THRk - \lambda AC[i]}{2}\right) + \cos(\lambda THRk) \cdot \cos(\lambda AC[i]) \cdot \sin^2\left(\frac{\mu THRk - \mu AC[i]}{2}\right)}$$

wherein:
- λTHk and μTHRk are the latitude and longitude coordinates (WGS 84) of the threshold of said index k landing runway;
- λAC[i] and μAC[i] are the usual latitude and longitude coordinates of the aircraft A; and
- R is the radius of the earth.

The angular deviation calculation device 32 further calculates the cumulative mean on the detection window of these deviations. Indeed, supposing that during the period of time when the runway determination device 4 saw the detection authorization Boolean unit at 1, this runway determination device 4 has calculated .rho. values of each one of these deviations, then the cumulative mean is given by the following formula:

$$\forall k \in [2, n], \overline{\zeta}k = \frac{1}{p+1} \cdot \sum_{i=0}^{p} \zeta k[i]$$

It should be noticed that in terms of integration into the runway determination device 4 wherein the automatic detection algorithm is located, it is easy to perform the calculation of this cumulative mean repeatedly. Indeed:

$$j = O \quad Sk[O] = \zeta k[O]$$

$$j = 1 \quad Sk[1] = \frac{1}{2} \cdot Sk[O] + \frac{1}{2} \cdot \zeta k[1]$$

$$\vdots$$

$$j = i \quad Sk[i] = \frac{i}{i+1} \cdot Sk[i-1] + \frac{1}{i+1} \cdot \zeta k[i]$$

$$j = p \quad \overline{\zeta}k = \frac{1}{p+1} \cdot \sum_{i=0}^{p} \zeta k[i] = Sk[p]$$

The runway selection device 35 finally allows the most likely landing runway to be selected throughout this detection phase. Indeed, as soon as the authorization Boolean unit decreases again to 0, the most likely runway will be that having the lowest cumulative mean, according to the following formula:

$$\exists kO \in [2, n], \overline{\zeta}kO = \min_{k} \overline{\zeta}k$$

The landing runway 2 is thus defined by a couple ({λTHRkO, μTHRkO}, QFUkO).

The invention claimed is:

1. A piloting assistance process for an aircraft to be performed during a landing phase on an airport being provided with a plurality of landing runways the aircraft including an automatic braking system being able to automatically brake the aircraft on the ground depending on a selected braking mode chosen from a plurality of different braking modes respectively performing different strength brakings, and the process comprises:
   (a) determining one of the landing runways of the airport to be a selected landing runway used for landing of the aircraft;
   (b) determining characteristics of the selected landing runway;
   (c) automatically and repeatedly determining the current position of the aircraft as a reference point connected to the selected landing runway; and
   (d) as soon as the aircraft flies at a predetermined height above the selected landing runway, automatically:
      (d1) estimating, using at least the current position and, further, using a standard descent plane to the selected landing runway and a performance model of the aircraft being calibrated on the braking capacity of a currently selected braking mode on the automatic braking system, a minimum braking distance representing the distance along the selected landing runway until the aircraft stops on the selected landing runway;
      (d2) comparing the minimum braking distance to a length of the selected landing runway;
      (d3) if the minimum braking distance is higher than the length of the selected landing runway, and as long as this is the case, automatically emitting at least one alarm in the cockpit of the aircraft, wherein, the alarm informs a crew of the aircraft that the braking capacity of the currently selected braking mode on the automatic braking system will not be sufficient for safely stopping the aircraft on the selected landing runway, thereby prompting the crew to select on the automatic braking system, a braking mode with a braking strength higher than that of the currently selected braking mode; and
      (d4) if the at least one alarm is emitted in the cockpit in step (d3), receiving a new braking mode selected by the crew at a mode selection input device, and then returning to step (d1) to verify whether the new braking mode selected by the crew will result in a minimum braking distance less than the length of the selected landing runway.

2. The process according to claim 1, further comprising:
   comparing the currently selected braking mode to a maximum braking mode of the automatic braking system, and emitting the alarm in step (d3) only if the currently selected braking mode does not correspond to the maximum braking mode.

3. The process according to claim 1, further comprising:
   (d5) if, at the end of a predetermined period of time after the alarm has been emitted in step (d3), the crew has not selected another braking mode, selecting automatically a new braking mode on the automatic braking system, the new braking mode having a higher braking strength than that of the currently selected braking mode.

4. The process according to claim 3, wherein step (d5) further comprises:
   (d5a) automatically selecting a braking mode with a braking strength immediately higher than that of the currently selected braking mode;
   (d5b) automatically checking whether such a selected braking mode is sufficient for safely stopping the aircraft on the landing runway; and
   repeating the steps (d5a) and (d5b) until a sufficient braking mode is obtained in step (d5b), such a sufficient braking mode being then selected automatically on the automatic braking system of the aircraft.

5. The process according to claim 1, further comprising automatically inhibiting step (d3) from a predetermined flight height above the landing runway, and this until the automatic braking system is activated.

6. The process according to claim 1, wherein step (a) further comprises:
   (a1) for each one of the landing runways of the airport, determining coordinates of the threshold and the orientation of the corresponding landing runway;
   (a2) repeatedly checking, whether a characteristic height depending on the current altitude of the aircraft and on the altitude of the airport is located within a predetermined height detection window;
   (a3) as soon as the characteristic height is located within the detection window, for each one of the landing runways, repeatedly calculating an angular deviation between the orientation of the corresponding landing runway and a line crossing both the current position of the aircraft and the threshold of the corresponding landing runway, taking into consideration the information determined in step (a1), until the characteristic height is again located outside the detection window; and
   (a4) once the characteristic height is again located outside the detection window, determining by selection of one of the landing runways taking into consideration the angular deviations calculated in step (a3).

7. The process according to claim 6, wherein step (a) further comprises:
   confirming a preliminary manual determination of the landing runway, carried out by a crew.

8. The process according to claim 1, wherein between steps (c) and (d), the method further comprises:
   checking that the aircraft is actually landing on the landing runway determined in step (a).

9. The process according to claim 1, wherein the performance model depends on the estimated state of the determined landing runway.

10. The process according to claim 1, wherein step (d1) further comprises:
- calculating, using the current position of the aircraft compared to a standard descent plane, a distance APD being relative to an air phase above the landing runway;
- calculating, using the performance model, a ground running distance GPD between touching the ground by the aircraft and a final stop of the aircraft; and
- summing the distances APD and GPD to determine the minimum braking distance.

11. The process according to claim 1, wherein in step (d1), the minimum braking distance is increased if the aircraft is located above a standard descent plane and reaches the standard descent plane beyond a threshold of the landing runway.

12. A piloting assistance device for an aircraft to be based during a landing phase on an airport being provided with a plurality of landing runways, the aircraft including an automatic braking system being able to automatically brake the aircraft on the ground depending on a currently selected braking mode chosen from a plurality of different braking modes respectively performing different strength brakings, the device comprising:
- a runway determination device that selects, upon the landing phase, one of the landing runways of the airport, that is to be used for landing;
- a data base that automatically supplies characteristics of the selected landing runway;
- a current position determination device that determines automatically the current position of the aircraft in a reference point connected to the selected determined landing runway;
- a minimum braking distance estimation device that estimates automatically, as soon as the aircraft flies at a predetermined height above the selected landing runway, using at least the current position and the currently selected braking mode, a minimum braking distance representing the distance along the selected landing runway until the aircraft stops on the selected landing runway;
- a comparing device to compare automatically the minimum braking distance to a length of the selected landing runway;
- an alarm device being able to emit automatically at least one alarm in the cockpit of the aircraft and being activated whenever the minimum braking distance is higher than the length of the selected landing runway; and
- a mode selection input device that receives a new braking mode selected by the crew after the alarm device emits the at least one alarm, the mode selection input device being operably connected to the minimum braking distance estimation device and the comparing device so as to verify whether the new braking mode selected by the crew will result in a minimum braking distance less than the length of the selected landing runway, wherein the minimum braking distance estimation device is formed so as to estimate the minimum braking distance, further using a standard descent plane to the selected landing runway and a performance model of the aircraft being calibrated on the braking capacity of a currently selected braking mode on the automatic braking system, and the alarm device emits, if applicable, an alarm to inform a crew that the braking capacity of the currently selected braking mode on the automatic braking system will not be sufficient for safely stopping the aircraft on the selected landing runway, which prompts the crew to select, on the automatic braking system, a braking mode with a higher braking strength than that of the currently selected braking mode.

13. The device according to claim 12, further comprising:
- an automatic reconfiguration device for automatically reconfiguring the automatic braking system.

14. The device according to claim 12, further comprising:
- an inhibition device able to inhibit at least the alarm device.

15. The device according to claim 12, wherein the runway determination device comprises:
- a coordinate threshold determination device for determining automatically, upon a landing phase, for each one of the landing runways of the airport, the coordinates of the threshold and the orientation of the corresponding landing runway;
- a height window checking device for repeatedly checking, whether a characteristic height depending on the current altitude of the aircraft and on the altitude of the airport is located within a predetermined height detection window;
- an angular deviation calculation device for calculating, repeatedly, as soon as the characteristic height is located within the detection window, for each one of the landing runways, an angular deviation between the orientation of the corresponding landing runway and a line crossing both the current position of the aircraft and the threshold of the corresponding landing runway, taking into consideration the information determined by the coordinate threshold determination device until the characteristic height is again located outside said detection window; and
- a runway selection device for determining one of the landing runways, taking into consideration the angular deviations calculated by the angular deviation calculation device.

16. The device according to claim 12, further comprising:
- a computer operably connected to the alarm device, the computer controlling the alarm device such that the at least one alarm is emitted only if the currently selected braking mode is not equivalent to a maximum braking mode enabled by the automatic braking system.

* * * * *

UNITED STATES PATENT AND TRADEMARK OFFICE
CERTIFICATE OF CORRECTION

| | | |
|---|---|---|
| PATENT NO. | : 8,494,692 B2 | Page 1 of 1 |
| APPLICATION NO. | : 13/063821 | |
| DATED | : July 23, 2013 | |
| INVENTOR(S) | : Fabrice Villaume et al. | |

It is certified that error appears in the above-identified patent and that said Letters Patent is hereby corrected as shown below:

On the Title Page, Item (75)

Inventors: delete "Valentova" and add --Villaume--

Signed and Sealed this
Eighteenth Day of November, 2014

Michelle K. Lee
*Deputy Director of the United States Patent and Trademark Office*